No. 687,735. Patented Dec. 3, 1901.
A. ELMENDORF.
HEATING DEVICE FOR LIQUIDS.
(Application filed Aug. 11, 1900.)
(No Model.)
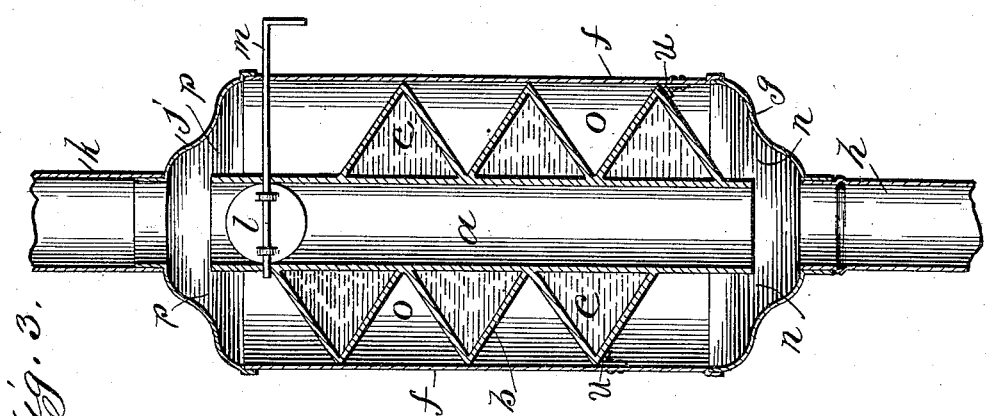
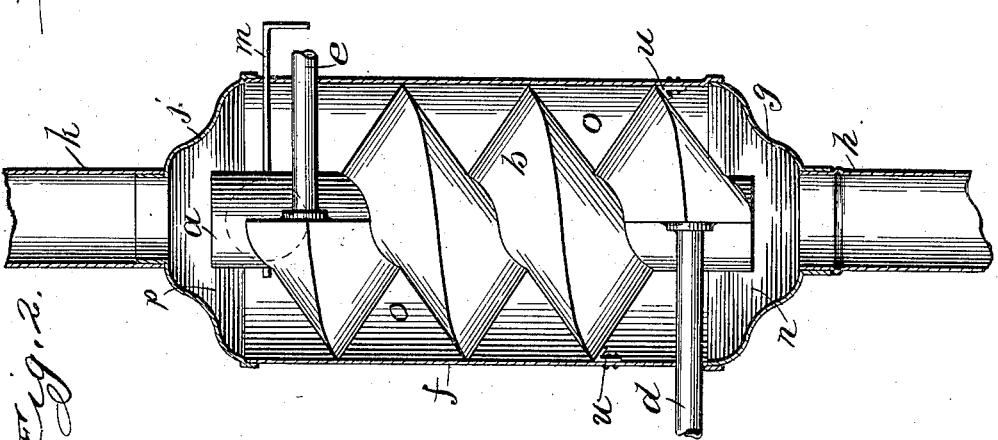
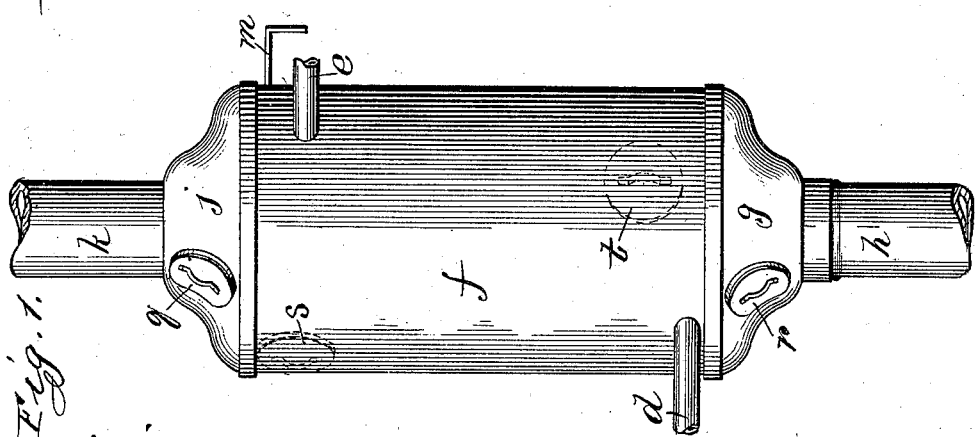
Witnesses:
R. J. Jacker.
Hattie O. Halvorson.
Inventor:
Albert Elmendorf,
By Coburn, Stibben & McElroy,
Attys.

UNITED STATES PATENT OFFICE.

ALBERT ELMENDORF, OF CHICAGO, ILLINOIS, ASSIGNOR OF ONE-FOURTH TO R. J. COX, OF BLUE ISLAND, ILLINOIS.

HEATING DEVICE FOR LIQUIDS.

SPECIFICATION forming part of Letters Patent No. 687,735, dated December 3, 1901.

Application filed August 11, 1900. Serial No. 26,620. (No model.)

*To all whom it may concern:*

Be it known that I, ALBERT ELMENDORF, a resident of Chicago, in the county of Cook and State of Illinois, have invented certain new and useful Improvements in Heating Devices for Liquids, of which the following is a specification.

My invention relates to a novel heater for liquids, and is designed to produce a simple device that can be inserted in a stovepipe or any other flue through which is passing any heated fluid and by which water or any other liquid desired can be readily heated.

It consists, primarily, of a direct pipe or conduit for the smoke and products of combustion or other heated fluid, in combination with an indirect pipe or conduit for the smoke, &c., and a receptacle for the liquid to be heated preferably interposed between said direct and indirect conduits, which are also provided with connections and a controlling-valve whereby the smoke, &c., can be permitted to pass through the direct conduit or forced through the indirect one, thereby heating the liquid to a greater extent than if it is permitted to pass freely through the direct conduit.

To fully illustrate my invention, reference is had to the accompanying sheet of drawings, in which the same reference characters are used to designate identical parts in all the figures, of which—

Figure 1 is a side elevation of the complete device. Fig. 2 is a central section through the outer casing, showing the direct conduit and the receptacle in elevation; and Fig. 3 is a central longitudinal section through the entire mechanism.

To illustrate my invention in its simplest form, I have shown it as constructed to be placed in a stovepipe, taking the place of a joint thereof, although it will be understood that it might be applied to a furnace or any other source of heated air, vapor, smoke, or other products of combustion.

The direct conduit consists of the central pipe $a$, which is in the form of a circular tube and which has the receptacle $b$ for the liquid in the form of a helical channel $c$, secured about the pipe $a$ and preferably formed integrally therewith. The preferred shape of this helical channel is that it shall be substantially in the form of an equilateral triangle in cross-section, with one side thereof forming the wall of the tube $a$. The upper and lower ends of the receptacle $b$ have the supply-pipe $d$ and the discharge-pipe $e$, respectively, let into them and leading to any desired source of supply and point of discharge. Immediately surrounding the receptacle $b$ is the inclosing drum $f$, which is preferably a metallic shell which is provided with the tapering bottom piece $g$, by which it may be attached to a stovepipe $h$, and a similar tapering top piece $j$, by which it is attached to the joint $k$ of the stovepipe. The pipe $a$ has located in it at any desired position, preferably at its upper end, the circular valve or damper $l$, which is provided with the handle $m$, which passes through suitable apertures to the outside of the drum $f$, by which the position of the valve can be controlled. As will be seen, especially from the section in Fig. 3, the pipe $a$ does not extend all the way to the sections $h$ and $k$ of the stovepipe in which it is placed, but terminates a sufficient distance from these sections, so that an annular passage, as it were, is formed at $n$, leading from the section $h$ of the pipe to the complementary helical channel $o$, formed between the receptacle $b$ and the inclosing drum $f$. This indirect conduit $o$ opens by means of the annular aperture, as it were, at $p$ into the upper section $k$ of the pipe.

With the construction herein shown the operation of the device will be readily apparent. When the damper $l$ is in the position shown in Fig. 3, the smoke will practically all ascend through the direct conduit $a$, heating the contents of the receptacle $b$ but slightly, inasmuch as the smoke passes through so directly and rapidly that only a small portion of its heat will be absorbed. If now the damper $l$ be turned at right angles, so as to close the direct passage $a$, the smoke will be forced to ascend through the indirect passage or conduit $o$. As this is a tortuous passage, having a much greater length than the direct passage, and as the surface of the receptacle exposed is very much greater than that exposed to the direct conduit, a very much greater portion of the heat of the smoke, &c., will be absorbed by the receptacle $b$ and its contents. So much of the heat will be absorbed that the contents of the receptacle $b$ will soon be heated to a high degree, and a considerable quantity of heated liquid can be obtained therefrom.

To readily clean out the indirect pipe $o$, I provide an aperture in the top of the casing $f$, preferably in the top piece $j$, which is closed by the movable cap $q$. At a suitable point in the bottom of the casing, preferably in the bottom piece $g$, I provide an aperture which is closed by the cap $r$. By removing these caps $q$ and $r$ and inserting a ball tied to a string or wire the ball will run around through the indirect conduit $o$ and can be grasped and pulled through the aperture in the lower end, and the string thus passed through the apparatus can be used to draw any desired cleaning device or material therethrough. It will be readily apparent that instead of placing the aperture in the top and bottom pieces I might locate them in the sides, as indicated in dotted lines at $s$ and $t$.

While the supply-pipes $d$ and $e$, passing through the casing $f$, will ordinarily furnish sufficient support for the tube $a$ and the liquid-receptacle $b$, I may employ one or more supports $u$, secured to the inner side of the casing $f$ near the bottom, upon which the outer edges of the lowest spire of the receptacle $b$ rests.

It will thus be seen that I have produced a simple and compact structure that is capable of supplying a considerable amount of hot water or any other desired liquid, and that by the utilization of heat that is otherwise ordinarily wasted.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new, and desire to secure by Letters Patent of the United States, is—

1. The combination with a flue, of a direct conduit or pipe, a liquid-receptacle surrounding the same and consisting, in longitudinal section, of a series of triangles whose bases are arranged in contact with each other and along the entire outer face or surface of such direct conduit, pipes connected with the upper and lower ends respectively of the liquid-receptacle, a casing surrounding such receptacle and coöperating with its outer surface to form a tortuous passage, such casing being connected to the flue, and a valve or damper in the direct conduit to cause the gases, &c., to pass directly therethrough or to pass indirectly through such casing.

2. The combination with the smoke flues or pipes $h$ and $k$, of an enlarged casing connected at its ends with such flues, a direct conduit within the casing and consisting of a pipe in substantial alinement with the flues but shorter than the casing, a damper or valve in such pipe, a helically-arranged liquid-receptacle surrounding the direct conduit and substantially triangular in cross-section and means for supporting the outer surface of such receptacle upon the inner wall of said casing.

3. In a heating device for liquids, the combination of the direct conduit, as the cylindrical pipe $a$, with the liquid-receptacle, as the helical channel $c$, surrounding the same, the casing $f$ surrounding said liquid-receptacle and forming therewith the indirect conduit $o$, the pipes $h$ and $k$ connected to the casing $f$ by the bottom and top pieces $g$ and $j$, all coöperating substantially as and for the purpose described.

4. In a heating device for liquids, the combination with the pipe $a$ having a liquid-receptacle $b$ surrounding the same in the form of a helical channel, of the cylindrical casing $f$ surrounding the liquid-receptacle $b$ and the removable caps located adjacent to the ends of said receptacle and giving access thereto for cleaning the same without dismantling it, substantially as and for the purpose described.

5. In a heating device for liquids, the combination of the direct conduit $a$, with the receptacle $b$ surrounding the same and consisting of the helical channel $c$, the supply-pipe $d$ and the discharge-pipe $e$ opening into the lower and upper ends of said receptacle, the damper $l$ in the conduit $a$, a cylindrical casing $f$ surrounding said receptacle, and supports $u$ within the casing for supporting such receptacle, substantially as and for the purpose described.

6. In a heating device for liquids, the combination with the casing $f$ adapted to fit into a stovepipe, of the pipe $a$ therein forming a direct conduit, the helical liquid-receptacle $b$ between the pipe $a$ and the casing $f$, a damper $l$ in the pipe $a$, and the removable caps at the top and bottom of said casing by which the indirect conduit formed between the casing $f$ and the receptacle $b$ may be cleaned without dismantling the device.

ALBERT ELMENDORF.

Witnesses:
HATTIE O. HALVORSON,
J. H. MCELROY.